(12) United States Patent
Enomoto et al.

(10) Patent No.: US 11,630,977 B2
(45) Date of Patent: Apr. 18, 2023

(54) PRINTER, PRINT SYSTEM, AND STORAGE MEDIUM STORING PROGRAM

(71) Applicant: BROTHER KOGYO KABUSHIKI KAISHA, Nagoya (JP)

(72) Inventors: Katsunori Enomoto, Toyokawa (JP); Toyoshi Adachi, Kakamigahara (JP); Tomoya Kaneko, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/712,330

(22) Filed: Apr. 4, 2022

(65) Prior Publication Data

US 2022/0327338 A1 Oct. 13, 2022

(30) Foreign Application Priority Data

Apr. 12, 2021 (JP) .............................. JP2021-067021

(51) Int. Cl.
*G06K 15/02* (2006.01)
(52) U.S. Cl.
CPC ..... *G06K 15/1809* (2013.01); *G06K 15/1817* (2013.01); *G06K 15/1836* (2013.01)
(58) Field of Classification Search
CPC ........... G06K 15/1809; G06K 15/1817; G06K 15/1836
See application file for complete search history.

(56) References Cited

U.S. PATENT DOCUMENTS

| 2014/0313548 | A1* | 10/2014 | Nishikawa | G06F 3/1267 |
| | | | | 358/1.15 |
| 2016/0062716 | A1* | 3/2016 | Sasaki | H04N 1/00167 |
| | | | | 358/1.15 |
| 2017/0109110 | A1* | 4/2017 | Kitagata | G06F 3/1272 |
| 2018/0054540 | A1 | 2/2018 | Okuno | |

FOREIGN PATENT DOCUMENTS

JP 2018032891 A 3/2018

* cited by examiner

*Primary Examiner* — Juan M Guillermety
(74) *Attorney, Agent, or Firm* — Scully, Scott, Murphy & Presser, P.C.

(57) ABSTRACT

Instruction data is configured to include mode information indicating a print mode in download printing. The print mode includes a first mode and a second mode different from the first mode. The download printing includes: in response to extracting the mode information indicating the first mode, performing the download printing by the first mode, the first mode being a mode of, after completing reception of an entirety of a document, starting printing based on the entirety of the document; and in response to extracting the mode information indicating the second mode, performing the download printing by the second mode, the second mode being a mode of, before completing reception of the entirety of the document, starting printing based on a received portion of the document. The second mode is a mode in which reception of the document and printing based on the document are performed in parallel.

16 Claims, 9 Drawing Sheets

FIG. 3A

```
<Display>
        <NextURL>http://www.server-c.com/sel_kind_result</NextURL>
        <Title>Select print type</Title>
        <Select key=kind>
                <Item val="1">Manual</Item>
                <Item val="2">Application form</Item>
        </Select>
</Display>
```

FIG. 3B

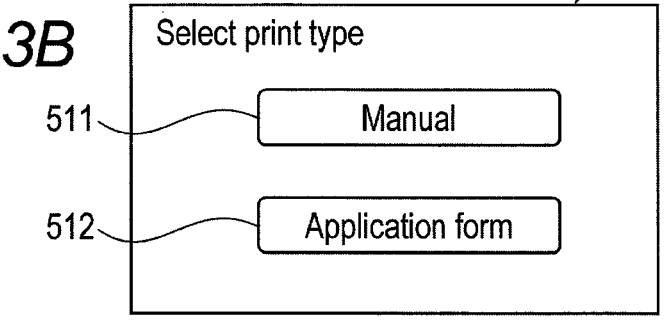

FIG. 4A

```
<Display>
        <NextURL>http://www.server-c.com/sel_target_result</NextURL>
        <Title>Select print target</Title>
        <Select key=target>
                <Item val="1">Terms and conditions</Item>
                <Item val="2">Operation manual</Item>
        </Select>
</Display>
```

FIG. 4B

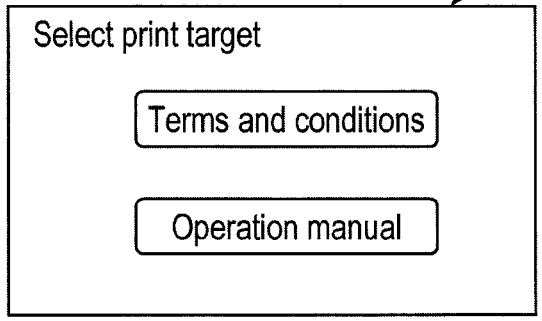

```
<Display>
        <NextURL>http://www.server-c.com/sel_target_result</NextURL>
        <Title>Select print target</Title>
        <Select key=target>
                <Item val="3">User registration application</Item>
                <Item val="4">Change notification application</Item>
        </Select>
</Display>
```

FIG. 5B

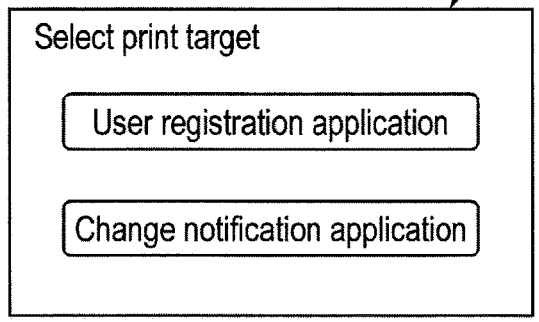

```
<Command>
        <DownloadPrint>
                <Path>http://www.server-d.com/manual/users.prn</Path>
                <Collate>1</Collate>
                <ParallelProcessing>true</ParallelProcessing>
        </DownloadPrint>
</Command>
```

```
<Command>
        <DownloadPrint>
                <Path>http://www.server-d.com/form/users.prn</Path>
                <Collate>1</Collate>
                <ParallelProcessing>false</ParallelProcessing>
        </DownloadPrint>
</Command>
```

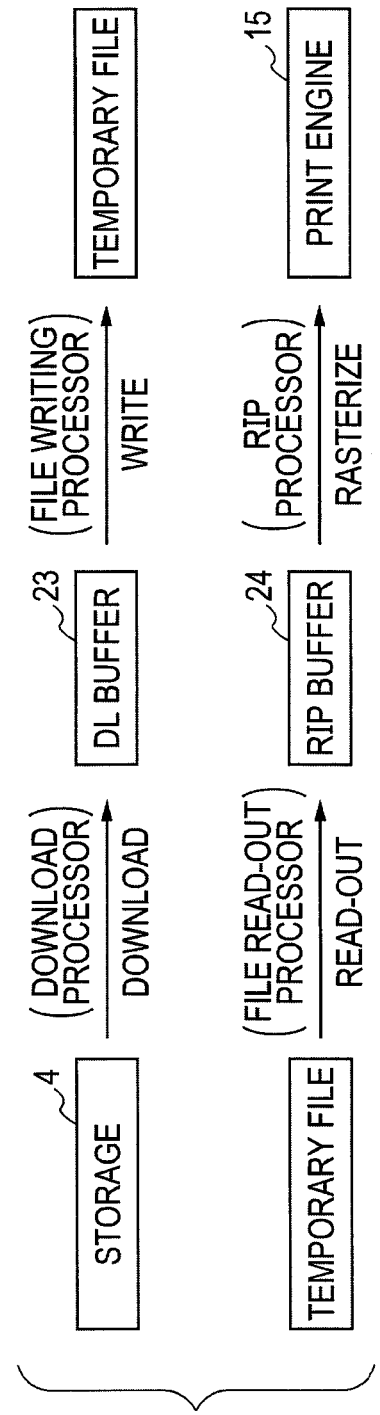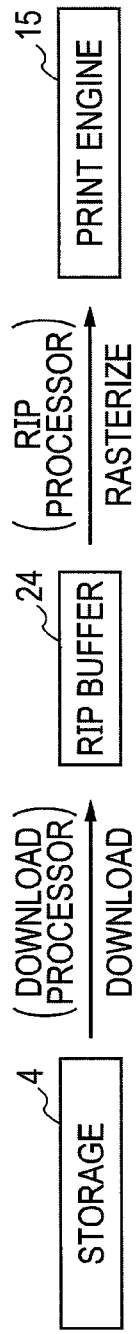

PRINTER, PRINT SYSTEM, AND STORAGE MEDIUM STORING PROGRAM

CROSS REFERENCE TO RELATED APPLICATIONS

This application claims priority from Japanese Patent Application No. 2021-067021 filed Apr. 12, 2021. The entire content of the priority application is incorporated herein by reference.

BACKGROUND

Conventionally, a print system including a printer and a server is known.

SUMMARY

According to one aspect, this specification discloses a printer. The printer includes a communication interface, a print engine, and a controller. The controller is configured to: acquire access information indicating a transmission source of instruction data, the instruction data instructing a process to be executed by the printer, the process to be executed by the printer including download printing of downloading a document from a storage on a network and printing the document, the instruction data being configured to include mode information indicating a print mode in the download printing, the print mode including a first mode and a second mode different from the first mode; based on the access information, access, via the communication interface, a server that is the transmission source of the instruction data, and receive the instruction data transmitted from the server; and in response to determining that the instruction data instructs execution of the download printing, extract the mode information from the instruction data; based on the mode information, download, via the communication interface, the document specified by an execution instruction of the download printing, from the storage, thereby receiving the document; and control the print engine to perform printing based on the received document, thereby performing the download printing. The download printing includes: in response to extracting the mode information indicating the first mode, performing the download printing by the first mode, the first mode being a mode of, after completing reception of an entirety of the document, starting printing based on the entirety of the document; and in response to extracting the mode information indicating the second mode, performing the download printing by the second mode, the second mode being a mode of, before completing reception of the entirety of the document, starting printing based on a received portion of the document, the second mode being a mode in which reception of the document and printing based on the document are performed in parallel.

According to another aspect, this specification also discloses a print system including a printer and a server. The printer is configured to: acquire access information indicating a transmission source of instruction data, the instruction data instructing a process to be executed by the printer, the process to be executed by the printer including download printing of downloading a document from a storage on a network and printing the document, the instruction data being configured to include mode information indicating a print mode in the download printing, the print mode including a first mode and a second mode different from the first mode; and based on the access information, request the server to transmit the instruction data. The server is configured to: in response to receiving a request for transmitting the instruction data, transmit the instruction data to the printer. The printer is configured to: receive the instruction data transmitted from the server; and in response to determining that the instruction data instructs execution of the download printing, extract the mode information from the instruction data; based on the mode information, download the document specified by an execution instruction of the download printing from the storage, thereby receiving the document; and perform printing based on the received document, thereby performing the download printing. The download printing includes: in response to extracting the mode information indicating the first mode, performing the download printing by the first mode, the first mode being a mode of, after completing reception of an entirety of the document, starting printing based on the entirety of the document; and in response to extracting the mode information indicating the second mode, performing the download printing by the second mode, the second mode being a mode of, before completing reception of the entirety of the document, starting printing based on a received portion of the document, the second mode being a mode in which reception of the document and printing based on the document are performed in parallel.

According to still another aspect, this specification also discloses a non-transitory computer-readable storage medium storing a set of program instructions for a printer. The set of program instructions, when executed by a controller of the printer, causes the printer to: acquire access information indicating a transmission source of instruction data, the instruction data instructing a process to be executed by the printer, the process to be executed by the printer including download printing of downloading a document from a storage on a network and printing the document, the instruction data being configured to include mode information indicating a print mode in the download printing, the print mode including a first mode and a second mode different from the first mode; based on the access information, access, via a communication interface of the printer, a server that is the transmission source of the instruction data, and receive the instruction data transmitted from the server; and in response to determining that the instruction data instructs execution of the download printing, extract the mode information from the instruction data; based on the mode information, download, via the communication interface, the document specified by an execution instruction of the download printing from the storage, thereby receiving the document; and control a print engine of the printer to perform printing based on the received document, thereby performing the download printing. The download printing includes: in response to extracting the mode information indicating the first mode, performing the download printing by the first mode, the first mode being a mode of, after completing reception of an entirety of the document, starting printing based on the entirety of the document; and in response to extracting the mode information indicating the second mode, performing the download printing by the second mode, the second mode being a mode of, before completing reception of the entirety of the document, starting printing based on a received portion of the document, the second mode being a mode in which reception of the document and printing based on the document are performed in parallel.

According to the technique disclosed herein, instruction data may include mode information indicating the print mode of download printing. The printer supports at least two print modes for download printing, the first mode and the second mode. The printer performs download printing according to the print mode shown in the mode information included in the instruction data. Thus, when the user specifies the print mode in the instruction data in advance, it is expected that download printing is performed by the print mode that suits the user's purpose and preference.

A print system including the printer, a control method for realizing the function of the printer, a computer program, and a computer-readable storage medium for storing the computer program are also new and useful.

BRIEF DESCRIPTION OF THE DRAWINGS

Embodiments in accordance with this disclosure will be described in detail with reference to the following figures wherein:

FIG. 3A is an explanatory diagram showing an example of instruction data;

FIG. 3B is an explanatory diagram showing an example of a display screen;

FIG. 4A is an explanatory diagram showing an example of instruction data;

FIG. 4B is an explanatory diagram showing an example of a display screen;

FIG. 5A is an explanatory diagram showing an example of instruction data;

FIG. 5B is an explanatory diagram showing an example of a display screen;

FIG. 6A is an explanatory diagram showing an example of instruction data;

FIG. 6B is an explanatory diagram showing an example of instruction data;

FIG. 10A is an explanatory diagram showing a data flow in a separate mode;

FIG. 10B is an explanatory diagram showing a data flow in a parallel mode.

DETAILED DESCRIPTION

In a print system, a printer accesses a server, analyzes instruction data sent from the server, and performs processing according to the instruction data. The printer performs download printing of downloading a document from a storage and printing the document. For example, in a case where the instruction data includes an execution instruction for download printing, the printer performs download printing according to the instruction data.

When performing download printing, a mode of starting printing after completing download of an entire document and a mode of starting printing before completing download of an entire document, that is, performing download and printing of the document in parallel are considered as the print mode. However, which print mode is used for printing is usually uniquely determined by the design of a printer.

This specification provides a technique for increasing the flexibility in selecting which print mode is used for a printer that performs download printing based on instruction data.

Figure 1:
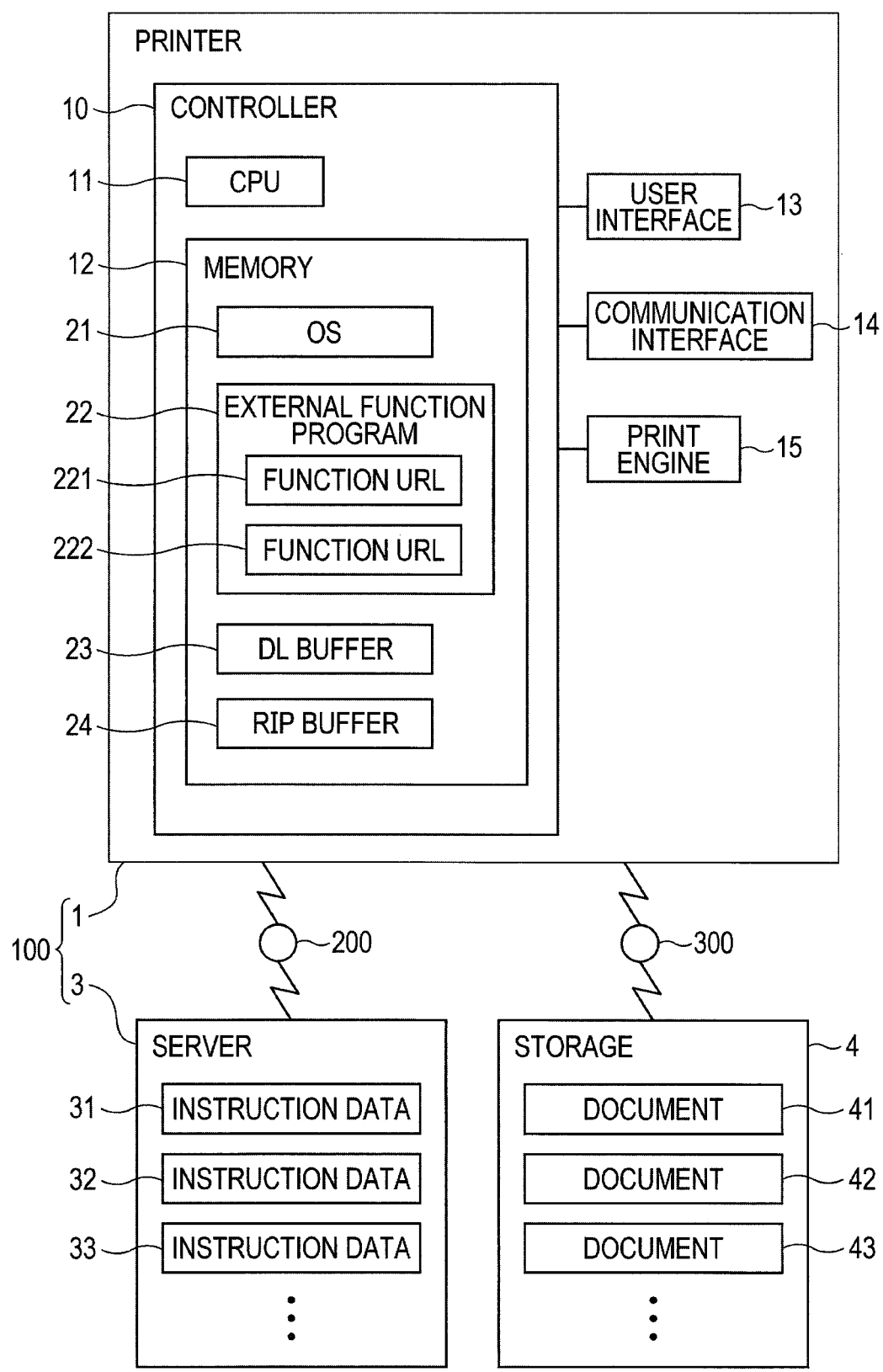
FIG. 1 is a block diagram showing the electrical configuration of a print system.

A print system 100 of an embodiment includes, for example, a printer 1 and a server 3 as shown in FIG. 1, and these are connectable to each other via a network 200. The print system 100 is an example of an image processing system. The printer 1 is further connectable to a storage 4 via a network 300.

As shown in FIG. 1, the printer 1 of this embodiment includes a controller 10 including a CPU 11 and a memory 12. Further, the printer 1 includes a user interface (hereinafter also referred to as "user IF") 13, a communication interface (hereinafter also referred to as "communication IF") 14, and a print engine 15 (printing unit), and these are electrically connected to the controller 10. The CPU 11 may be an example of a controller.

The CPU 11 executes various processes according to a program read from the memory 12 and based on a user's operation. As shown in FIG. 1, the memory 12 stores various programs and various information including an operating system (hereinafter referred to as "OS") 21 and an external function program 22. The external function program 22 is an example of a program. The memory 12 is also used as a work area when various processes are executed. A buffer included in the CPU 11 is also an example of the memory.

An example of the memory 12 is not limited to a ROM, a RAM, an HDD, and so on, built in the printer 1, and may be a storage medium that is read and written by the CPU 11. A computer-readable storage medium is a non-transitory medium. In addition to the above examples, the non-transitory medium also includes recording media such as a CD-ROM and a DVD-ROM. The non-transitory medium is also a tangible medium. On the other hand, an electric signal that carries a program downloaded from a server and so on, on the Internet is a computer-readable signal medium which is a kind of a computer-readable medium, but is not included in a non-transitory computer-readable storage medium.

The external function program 22 is a program that acquires instruction data from an external device such as the server 3 and realizes the function by processes based on the acquired instruction data. In the external function program 22, function URLs 221 and 222 for each external function are registered in advance by the designer of the print system 100 and so on. The function URLs 221 and 222 may be stored in an internal memory (that is, the memory 12) or may be stored in an external device which is accessible by the printer 1. That is, the memory storing the function URLs 221 and 222 may be an internal memory or an external memory. The function URLs 221 and 222 are information including access information indicating the transmission source of instruction data that starts execution of each external function. The printer 1 may directly accept the registration instruction of the function URL via the user interface 13, for example, or may accept the registration instruction via the network by using an Embedded Web Server. The details of the external function program 22 will be described later.

The designer and so on of the print system 100 may store a plurality of instruction data in the server 3, thereby designing the printer 1 to perform a series of processes combining display of an input screen, download printing, processes other than download printing, and so on. Further, the printer 1 may return information of a parameter received on the input screen to the server 3, pass the inputted parameter via instruction data, and reflect the parameter in the series of processes. The designer and so on of the print system 100 include, for example, a system administrator of a company that has introduced the printer 1, a vendor of the print system 100 may be the printer 1, and a designer or a service person of a manufacturer or a dealer of the printer 1.

The memory 12 is further provided with a download buffer (hereinafter also referred to as "DL buffer") 23 and a RIP buffer 24. The DL buffer 23 is a buffer for temporarily storing data downloaded from an external device. The DL buffer 23 is an example of a first buffer. The RIP buffer 24 is a buffer for temporarily storing data to be printed, which is the target of a rasterization process. The RIP buffer 24 is an example of a second buffer. Each of the DL buffer 23 and the RIP buffer 24 is a storage area having a particular size.

The user interface 13 is a touch panel, for example. The user interface 13 includes hardware for displaying a screen for notifying the user of information and hardware for accepting operations by the user. The user interface 13 may be a set of a display and an operation device such as a button.

The communication interface 14 includes a configuration that is connectable to the network 200 and the network 300. The communication interface 14 includes hardware for communicating with the server 3 via the network 200 and hardware for communicating with the storage 4 via the network 300. The communication standard of the communication interface 14 may be Ethernet, Wi-Fi, USB, and so on ("Wi-Fi" is a registered trademark of the Wi-Fi Alliance). The printer 1 may include a plurality of communication interfaces 14 corresponding to a plurality of communication standards. The network 200 and the network 300 may be a local network connected to the printer 1 or may be the Internet. Further, the network 200 and the network 300 may be the same network.

The print engine 15 includes a configuration for printing an image based on image data on a print medium such as a sheet. The image forming method of the print engine 15 is, for example, an electrophotographic method or an inkjet method. The print engine 15 may be configured to perform color printing or configured to perform only monochrome printing.

As shown in FIG. 1, the server 3 stores one or more instruction data 31, 32, 33, and so on, and has a function of transmitting specified instruction data based on a transmission instruction from the printer 1 and so on. The instruction data of this embodiment is information configured to be analyzed by the external function program 22 of the printer 1, and is, for example, an xml file prepared by the designer of the print system 100 and so on. The details of instruction data will be described later.

As shown in FIG. 1, the storage 4 stores various documents for download printing, for example. Each document is print target data prepared by the designer of the print system 100 and so on, and is data indicating, for example, various application forms, various report forms, operation manuals for various devices, and terms and conditions. The document is not limited to a text document, but may be a photograph, an image, or a chart. Each document stored in the storage 4 is, for example, print data generated by a printer driver supporting the printer 1. The storage 4 may be a part of the server 3.

Next, the procedure of an external function process executed by the external function program 22 of the printer 1 based on an instruction of the user will be described with reference to the flowchart of FIG. 2. The external function process is executed by the CPU 11 of the printer 1 in response to receiving an instruction by the user to start execution of the external function program 22 via the user interface 13, for example.

The following process basically indicates the process of the CPU 11 according to the instruction described in a program. That is, the processes such as "determination", "extraction", "selection", "calculation", "decision", "identification", "acquisition", "reception", and "control" in the following description represent the processes by the CPU 11. The process by the CPU 11 also includes hardware control using an API of the OS. In this specification, the operation of each program will be described by omitting the description of the OS. That is, in the following description, the description that "a program B controls hardware C" may mean "a program B controls hardware C using the API of the OS". In addition, the process of the CPU 11 according to the instruction described in the program may be described in abbreviated wording. For example, it may be described as "the CPU 11 performs". Further, the process of the CPU 11 according to the instruction described in the program may be described by a wording that omits the CPU, such as "a program A performs".

Note that "acquisition" is used as a concept that does not require a request. That is, a process of receiving data without being requested by the CPU 11 is also included in the concept of "the CPU acquires data". The "data" in this specification is represented by a computer-readable bit string. Data having the same substantial meaning and different formats are treated as the same data. The same applies to "information" in this specification. Further, "request" and "instruct" are concepts indicating that information indicating that a request is being made or information indicating that an instruction is being given is outputted to the counterpart. Further, the information indicating that the request is being made or the information indicating that the instruction is being given is simply described as "request" or "instruction", respectively.

Further, the CPU 11's process of determining whether information A indicates matter B may be conceptually described as "determining from information A whether it is matter B". The CPU 11's process of determining whether information A indicates matter B or indicates matter C may be described conceptually as "determine from information A whether it is matter B or matter C".

In the external function process, the CPU 11 reads out a function URL from the memory 12 (S101), accesses the server 3 using the acquired function URL, and receives a particular xml file as instruction data (S102). S102 is an example of a reception process. An instruction to start the external function process given by a user's operation via the user interface 13 is an example of an access operation of instructing access to the server 3. For example, the server 3 may contain a plurality of instruction data for causing the printer 1 to perform a series of processes stored by a vendor of the print system 100, or a designer or a service person at a manufacture or a dealer of the printer 1. For example, a system administrator of a company having introduced the printer 1 may store, in the function URL of the printer 1, information indicating instruction data to be accessed first during the series of processes. Alternatively, the function URL in the printer 1 may contain information indicating particular instruction data stored in advance by the vendor of the print system 100, for example.

The function URL 221 in the printer 1 of this embodiment contains access information such as "http://www.server-c.com/downloadprint_top.xml," for example, registered for starting a download printing function. If an instruction by a user to perform the download printing function is accepted as an external function, the CPU 11 reads out the function URL 221 in S101.

The instruction data includes display instruction data instructing screen display and operation instruction data instructing an operation. The CPU 11 analyzes the received instruction data, and determines whether the analyzed instruction data is the display instruction data or the operation instruction data (S103). More specifically, the CPU 11 determines the instruction data to be the display instruction data if this data contains a tag <Display>, and determines the instruction data to be the operation instruction data if this data contains a tag <Command>. As partially shown in FIG. 3A, for example, the instruction data 31 received first by the printer 1 using the function URL 221 is display instruction data instructing display of a selection screen for selecting a type of print target data. The name or value of each tag is not limited to an example shown in each drawing, as long as it is analyzable by the external function program 22 that analyzes instruction data.

If the received instruction data is determined to be the display instruction data (S103: display instruction), the CPU 11 causes the user interface 13 to display a display screen based on the determined instruction data (S104). If the instruction data 31 shown in FIG. 3A is received in response to the instruction to perform download printing, the CPU 11 causes the user interface 13 to display a selection screen 51, for example, containing a selection button 511 for selecting "manual" and a selection button 512 for selecting "application form" as shown in FIG. 3B. The selection screen 51 is an example of an input screen and S104 is an example of a display process.

Then, the CPU 11 stands by until a selection operation by the user is accepted via the user interface 13 on the displayed selection screen such as the selection screen 51, for example (S105). If the selection operation by the user is determined to be accepted (S105: YES), the CPU 11 determines whether the result of the user's selection is a target of a reply instruction (S106).

In some cases, the display instruction data contains a display instruction and a reply instruction. The reply instruction is an instruction to transmit a parameter as a reply indicating at least one of a document of a print target and a print setting to the server 3 based on the user's input accepted on the displayed screen. The instruction data 31 shown in FIG. 3A is instruction data not containing a reply instruction. The CPU 11 determines that the user's input accepted on the selection screen 51 is not a target of a reply instruction.

If the input is determined not to be a target of a reply instruction (S106: NO), the CPU 11 determines whether the instruction data being processed contains information for requesting transmission of next instruction data (S108). More specifically, the CPU 11 determines whether a tag <NextURL> is contained. The next instruction data is instruction data to be received after the processing of the instruction data being processed. Information in the tag <NextURL> in the instruction data 31 shown in FIG. 3A contains a URL for requesting next instruction data. The URL may contain information indicating the server 3. The "http" shown in the instruction data in FIG. 3 and so on may be changed to "https."

In response to determining that information for requesting transmission of next instruction data is contained (S108: YES), the CPU 11 acquires a URL corresponding to the information in the tag <NextURL> (S109). Then, the CPU 11 returns to S102 and requests the server 3 to transmit next instruction data by using the acquired URL.

Based on the user's input accepted on the selection screen 51 shown in FIG. 3B, for example, the CPU 11 extracts information indicating a selected button as information indicating the operation content. If "manual" is operated, for example, the CPU 11 extracts "1" as a value corresponding to "manual" from the instruction data. Then, by using the acquired URL, for example, the CPU 11 transmits HTML data containing the information indicating the operation content to the server 3. Based on the received HTML data, the server 3 transmits next instruction data corresponding to the selected button. Alternatively, the CPU 11 may create a URL by adding the information indicating the operation content as a parameter to the acquired URL, and transmits a request for a resource indicated by the created URL to the server 3. An operation screen for accepting user's input is not limited to a screen for accepting selection of a button but may be a screen for accepting input of text. In this case, the CPU 11 may regard inputted text itself as the information indicating the operation content.

In this embodiment, instruction data received next to the instruction data 31 is display instruction data of instructing display of a selection screen for accepting designation of print target data based on the type of print target data accepted on the selection screen 51. More specifically, if the selection button 511 is selected, the CPU 11 receives the instruction data 32 shown in FIG. 4A in S102, and displays a selection screen 52 shown in FIG. 4B in S104. Namely, if "manual" is selected as the type of print target data, the printer 1 further accepts selection of print target data from "terms and conditions" and "operation manual."

If the selection button 512 is selected, the CPU 11 receives the instruction data 33 shown in FIG. 5A in S102, and displays a selection screen 53 shown in FIG. 5B in S104. Namely, if "application form" is selected as the type of print target data, the printer 1 further accepts selection of print target data from "user registration application" and "change notification application." The selection screen 52 and the selection screen 53 are examples of a selection screen for selecting print target data (data to be printed) of the download printing.

When selection for the print target data is accepted on the selection screen 52 or on the selection screen 53, the CPU 11 further acquires a next URL based on the accepted selection result, returns to S102, and receives instruction data again from the server 3. In this embodiment, due to the size of the user interface 13 of the printer 1, selections are made in two stages on the exemplary selection screens on each of which selection is accepted from two options. Alternatively, four options each showing print target data may be displayed from the beginning, and selection by the user may be accepted.

FIGS. 6A and 6B shows an example of the instruction data received by the third execution of S102. FIG. 6A shows an example of instruction data 34 responsive to selection of "operation manual" on the selection screen 52. FIG. 6B shows an example of instruction data 35 responsive to selection of "user registration application" on the selection screen 53. Each of the instruction data 34 and the instruction data 35 is instruction data containing the tag <Command> and is operation instruction data. The operation instruction data about download printing contains an item specifying a document to be downloaded by a file name. For example, each of the instruction data 34 and the instruction data 35 shown in FIGS. 6A and 6B contains a tag <Path> in which a document of a print target is specified by a file name.

Display instruction data prepared by a designer of the print system 100, for example, may be data not only for accepting selection of a document as a download target but also for accepting selection of a print setting such as the number of print copies, selection from duplex printing and single-side printing, or selection from color printing and monochrome printing, for example. In this case, the selection screen includes a space for inputting the number of print copies, a button for selecting duplex printing or single-side printing, or a button for selecting color printing or monochrome printing, and so on (examples of a parameter indicating a print setting). The display instruction data for accepting selection of a print setting contains a reply instruction to transmit the result of the accepted selection as a reply to the server 3. If the reply instruction is contained in the received display instruction data, the CPU 11 determines in S106 that the received display instruction data is a target of the reply instruction (S106: YES), and transmits information about a print setting such as the number of print copies as a reply to the server 3 (S107) based on user's input. S107 is an example of a reply process.

In response to receiving the information about a print setting and an instruction to transmit next instruction data, the server 3 edits the instruction data instructed to be transmitted based on the received information, and transmits the edited instruction data to the printer 1. In response to receiving information indicating that the number of print copies is 2, for example, the server 3 generates instruction data in which the value in a tag <Collate> is "2" indicating two copies in the instruction data 34 or the instruction data 35 shown in FIGS. 6A and 6B, and transmits the generated instruction data to the printer 1. The printer 1 acquires the information about the number of print copies from the value in the tag <Collate> by analyzing the received instruction data.

If the received instruction data is determined to be operation instruction data (S103: operation instruction), the CPU 11 determines whether an instructed operation is download printing (S110). The instruction data 34 or the instruction data 35 shown in FIGS. 6A and 6B is instruction data containing a tag <DownloadPrint>, and the CPU 11 determines that this instruction data is instruction data instructing download printing.

If this instruction data is determined to be instruction data instructing download printing (S110: YES), the CPU 11 determines whether the instruction data contains mode information (S111). The mode information is information indicating a print mode for the download printing, and the mode includes a separate mode of starting printing after download of an entire document is completed, and a parallel mode of starting printing before download of an entire document is completed and download and printing are performed in parallel. The separate mode is an example of a first mode, and the parallel mode is an example of a second mode.

According to the separate mode, printing is not started before download is completed so it may cause delay in printing start timing. After the printing is started, however, the printing proceeds at high speed. According to the parallel mode, printing is started even if download is not completed so printing start timing comes earlier. After the printing is started, however, a waiting period for the download may be generated and this may cause delay in progress of the printing. The printer 1 of this embodiment is configured to perform both download printing by the separate mode and download printing by the parallel mode.

For example, in each of the instruction data 34 and the instruction data 35 shown in FIGS. 6A and 6B, a value in a tag <ParallelProcessing> corresponds to the mode information. The CPU 11 analyzes the instruction data to determine the presence or absence of the tag <ParallelProcessing> and to extract a value from this tag. S111 is an example of an extraction process. In this embodiment, based on result of the extraction, the CPU 11 determines that the instruction data specifies the separate mode if a value in the tag <ParallelProcessing> is "false", and determines that the instruction data specifies the parallel mode if a value in the tag <ParallelProcessing> is "true".

The mode information is incorporated in advance in the instruction data by a designer of the print system 100, for example. A document having a small number of pages requires not a very long time for download, for example. Thus, the separate mode of high printing progression speed tends to be suitable for such a document. A document having a large number of pages may require a long time for completion of download. Thus, the parallel mode of causing printing start timing to come earlier tends to be suitable for such a document.

The designer who generates instruction data, for example, may determine which mode is to be employed for which document, in accordance with preference of a user who instructs execution of download printing. Further, selection of the mode information by the user who performs download printing may be accepted as the target of the above-described reply instruction. For example, display instruction data may be added for displaying a selection screen containing a "parallel" button or a "separate" button for selecting the mode information, and a parameter based on the user's selection may be returned to the server 3. In this way, operation instruction data including the mode information of the mode selected by the user is transmitted.

If the instruction data is determined to contain the mode information (S111: YES), the CPU 11 determines whether a mode specified by the mode information is the separate mode or the parallel mode (S112). If the mode is determined to be the separate mode (S112: separate), the CPU 11 first performs a download process (S115), and then performs a read-out printing process (S116). A set of the download process and the read-out printing process is an example of a download printing process of performing download printing according to the first mode.

In the printer 1 of this embodiment, the separate mode is a default print mode. Specifically, in response to determining that the instruction data does not contain the mode information (S111: NO), the CPU 11 performs S115 and S116. The default print mode may be the parallel mode. In this case, if a determination in S111 is NO, the CPU 11 proceeds to S118.

Figure 7:
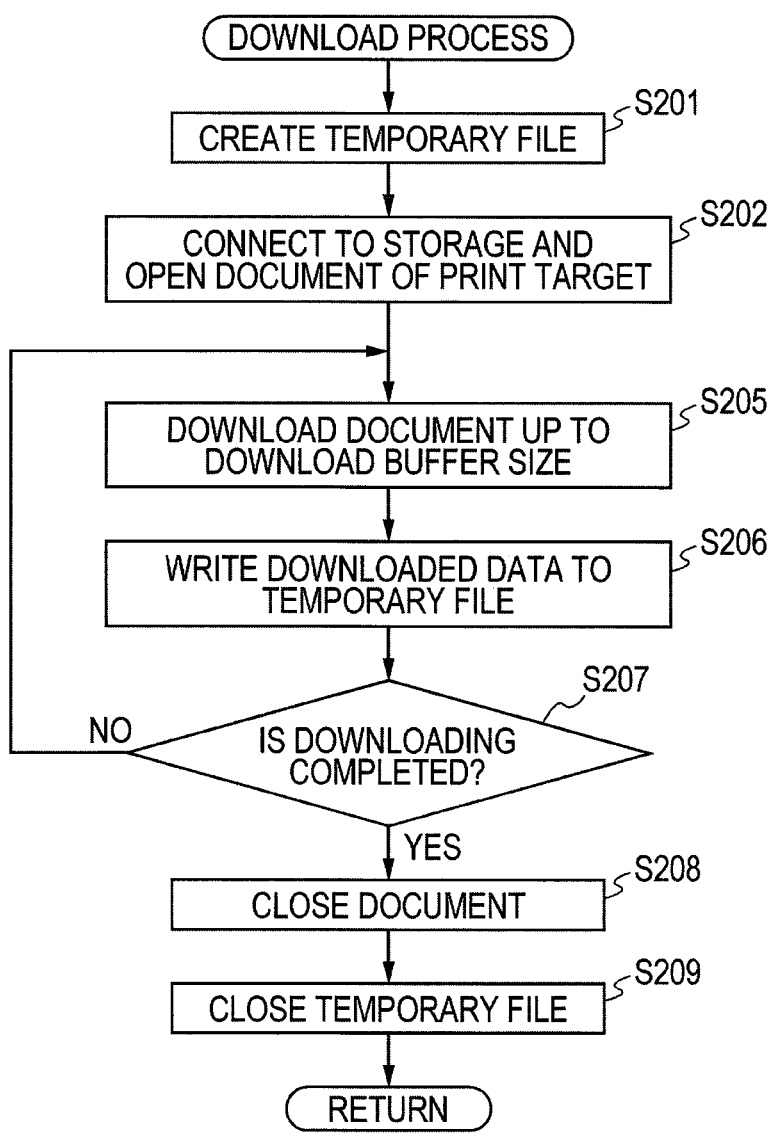
FIG. 7 is a flowchart showing the procedure of a download process.

A procedure of the download process by the separate mode will be described by referring to the flowchart in FIG. 7. The download process is processing of downloading a document from the storage 4 and storing the downloaded document into a temporary file. The temporary file is a file for temporary storage of downloaded file.

In the download process, the CPU 11 generates a temporary file in the memory 12 (S201), and connects to the storage 4 to open a document of the print target (S202). Next, the CPU 11 downloads the document of the print target in units of the size of the DL buffer 23 (see FIG. 1) (S205), and writes data having been downloaded into the temporary file generated in S201 (S206).

Then, the CPU 11 determines whether download of the entire document of the print target has been completed (S207). For example, if the size of the data having been downloaded in S205 is smaller than the size of the DL buffer 23, the CPU 11 determines that the download has been completed. If the size of the data having been downloaded is equal to the size of the DL buffer 23, the CPU 11 determines that the download may not be completed.

In response to determining that the download has not been completed (S207: NO), the CPU 11 returns to S205 and performs further download and further writing into the temporary file. In response to determining that the download has been completed (S207: YES), the CPU 11 closes the document in the storage 4 (S208). Then, the CPU 11 closes the temporary file (S209), finishes the download process, and returns to the external function process.

Figure 2:
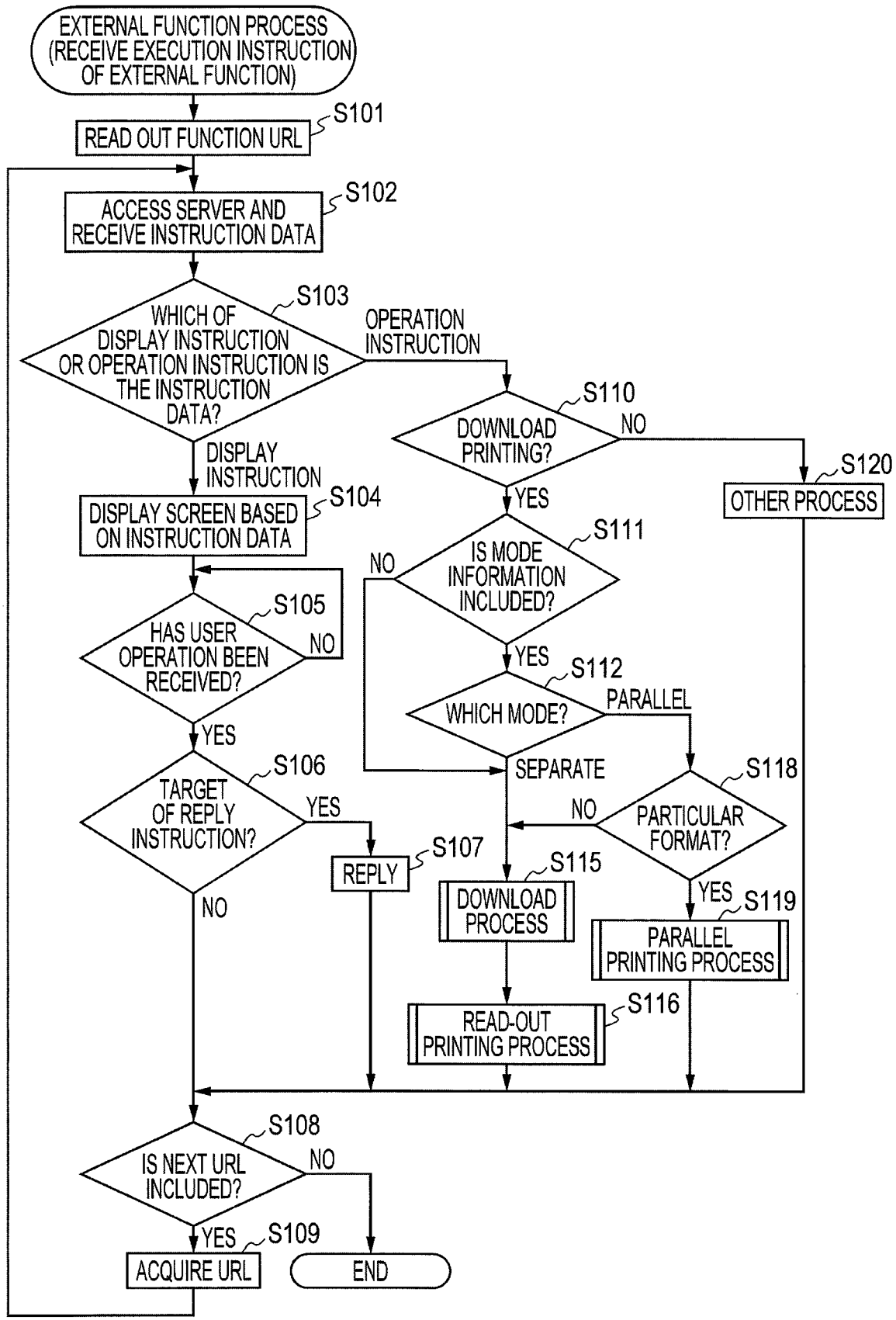
FIG. 2 is a flowchart showing the procedure of an external function process.
Figure 8:
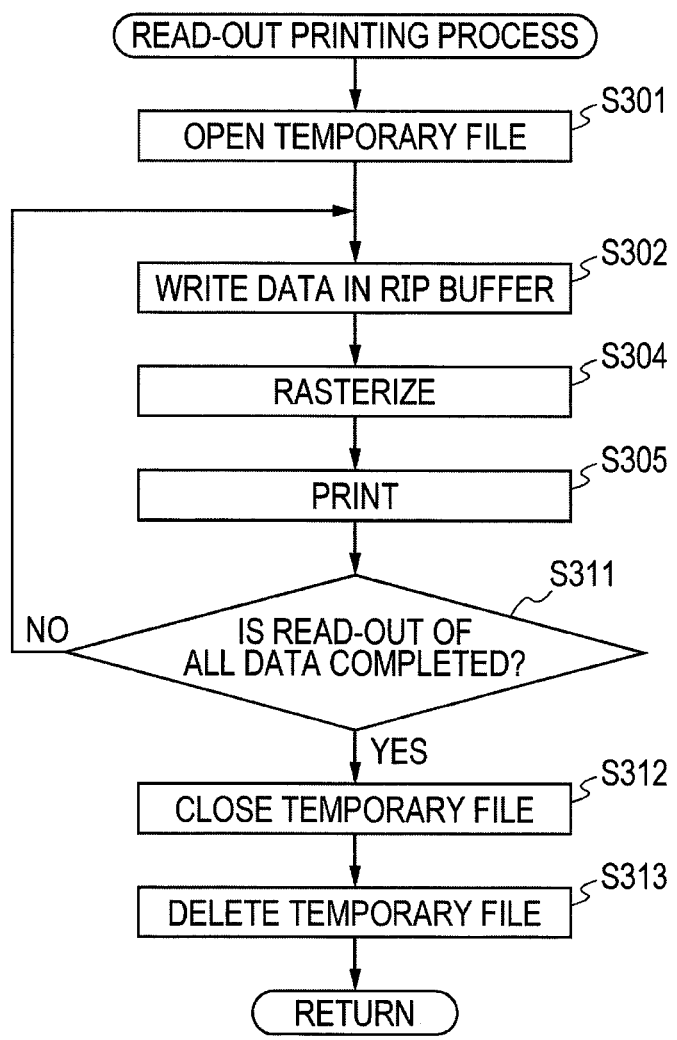
FIG. 8 is a flowchart showing the procedure of a read-out printing process.

In the external function process in FIG. 2, the CPU 11 performs the read-out printing process (S116) after completion of the download process (S115). A procedure of the read-out printing process will be described by referring to the flowchart in FIG. 8.

In the read-out printing process, the CPU 11 opens the temporary file which is generated and for which writing is performed in the above-described download process (S301). The CPU 11 reads data from the temporary file and writes the read data into the RIP buffer 24 (S302). Based on the size of free space of the RIP buffer 24, for example, the CPU 11 tries to read data of the size of free space from the temporary file and write the read data into the RIP buffer 24.

The data written into the RIP buffer 24 are rasterized sequentially by an RIP processor that performs RIP processing (S304), and resultant print data is transferred to the print engine 15. S304 is an example of a raster process. The print engine 15 performs printing based on the received print data (S305). The RIP processor deletes a part of the data for which the RIP processing is finished from the RIP buffer 24.

The CPU 11 determines whether read-out of all the data in the temporary file has been completed (S311). If the size of data having actually been read out from the temporary file in S302 is smaller than the size of free space, for example, the CPU 11 determines that reading of all the data has been completed. In response to determining that the read-out has not been completed (S311: NO), the CPU 11 returns to S302 and continues read-out from the temporary file.

In response to determining that read-out of all the data has been completed (S311: YES), the CPU 11 closes the temporary file (S312), and deletes the temporary file (S313). Then, the CPU 11 finishes the read-out printing process and returns to the external function process.

The external function process will be described again by referring back to FIG. 2. If the instruction data is determined to contain mode information specifying the parallel mode (S112: parallel), the CPU 11 determines whether a document of the print target is a document of a particular format (S118). In order to perform download printing by the parallel mode appropriately, the format of the document should be such that, even if download of the entire document is not completed, it allows execution of rasterizing appropriately based on downloaded part of data. The particular format is a format that allows rasterizing to be started by analyzing a beginning portion of the document.

If the document is determined not to be of the particular format (S118: NO), the CPU 11 determines to employ the separate mode and proceeds to S115. In the case of a PDF document, for example, a printing parameter may be added to the end of the document. The PDF format is not the particular format since it allows rasterizing to be started only after analysis of the document is finished to the end. In the case of a document of a format other than the particular format, the printer 1 may stop the processing by determining that this document is not a target of download printing.

If the instruction data specifies the parallel mode and the print target data is determined to be a document of the particular format (S118: YES), the CPU 11 performs a parallel printing process (S119). The document of the particular format is a document generated by a printer driver compatible with the printer 1, for example, and is a document of a format such as PCL, PCLXL, or PS. The parallel printing process is an example of a download printing process of performing download printing according to the second mode.

Figure 9:
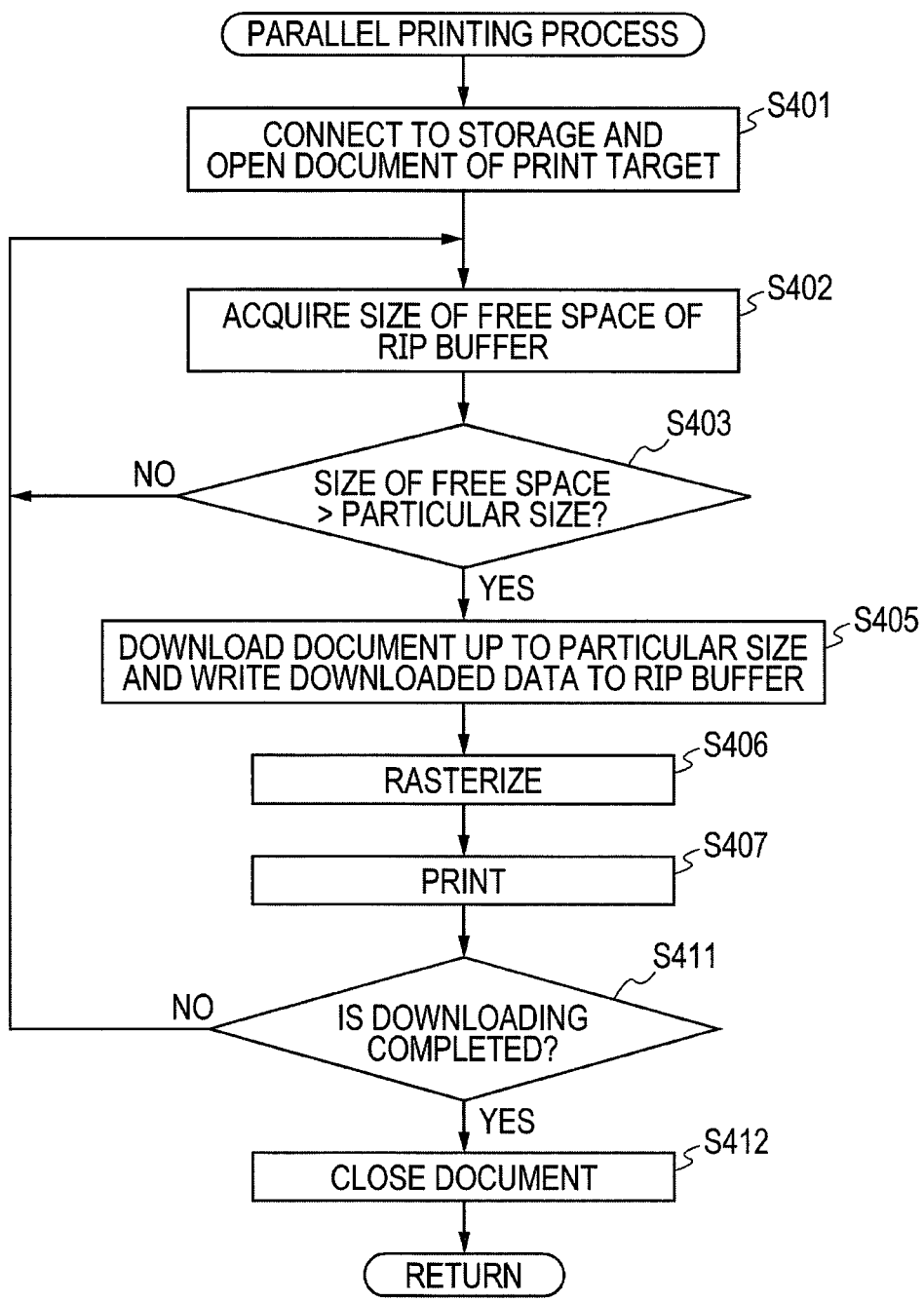
FIG. 9 is a flowchart showing the procedure of a parallel printing process.

A procedure of the parallel printing process will be described by referring to the flowchart in FIG. 9. In the parallel printing process, the CPU 11 connects to the storage 4 to open a document of the print target (S401). S401 corresponds to S202 in the download process shown in FIG. 7. Next, the CPU 11 acquires the size of free space in the RIP buffer 24 (S402). Then, the CPU 11 determines whether the size of free space is larger than a particular size (S403). The particular size is a fixed value determined in advance based on download speed and printing speed of the print engine 15.

If the size of free space is determined not to be larger than the particular size (S403: NO), the CPU 11 returns to S402 and acquires the size of free space in the RIP buffer 24 again. The size of free space in the RIP buffer 24 is increased gradually by deletion of data for which the rasterizing process by the RIP processor is finished.

If the size of free space is determined to be larger than the particular size (S403: YES), the CPU 11 downloads the document in the storage 4 up to the particular size and writes the downloaded document into the RIP buffer 24 (S405). Instead of writing the document directly into the RIP buffer 24, the CPU 11 may write the received document once into the DL buffer 23 and may transfer the written document immediately thereafter from the DL buffer 23 to the RIP buffer 24.

After the data is written into the RIP buffer 24, the written data is rasterized by the RIP processor (S406), and the print engine 15 performs printing based on resultant print data (S407). S406 corresponds to S304 in the read-out printing process shown in FIG. 8 and is an example of the raster process.

The CPU 11 determines whether download of the entire document of the print target has been completed (S411). For example, if the size of the data having been downloaded in S405 is smaller than the particular size, the CPU 11 determines that the download has been completed. If the size of the data having been downloaded is equal to the particular size, the CPU 11 determines that the download may not be completed. In response to determining that the download has not been completed (S411: NO), the CPU 11 returns to S402 and performs further download and further printing.

In response to determining that the download has been completed (S411: YES), the CPU 11 closes the document in the storage 4 (S412). Then, the CPU 11 finishes the parallel printing process, and returns to the external function process. If data remains in the RIP buffer 24, the RIP processor continues to perform its processing.

Differences in data flow between the separate mode and the parallel mode will be described using FIG. 10. As shown in FIG. 10A, according to the separate mode, data downloaded from the storage 4 by a download processor is stored once into the DL buffer 23, and is then written into a temporary file by a file writing processor. Then, the data in the temporary file is read by a file read-out processor, written into the RIP buffer 24, rasterized by the RIP processor, and thereafter transferred to the print engine 15. The upper section in FIG. 10A is a data flow by the download process shown in FIG. 7. The lower section in FIG. 10A is a data flow by the read-out printing process shown in FIG. 8.

According to the separate mode, the size of the temporary file is increased gradually by the download, and a free space in the memory 12 of the printer 1 decreases. The printer 1 monitors the free space in the memory 12. If the free space in the memory 12 becomes smaller than a particular threshold, the printer 1 may start the read-out printing process without waiting for completion of the download process. Specifically, if the memory becomes nearly full, the printer 1 reads the document, from its beginning, which is being written into the temporary file and starts printing even before download of the entire document is completed, and deletes part of the data for which the printing is finished. In this case, the CPU 11 performs the download process and the read-out printing process in parallel. A set of the download process and the read-out printing process performed in parallel is an example of download printing according to the second mode.

As shown in FIG. 10B, according to the parallel mode, data downloaded from the storage 4 by the download processor is written into the RIP buffer 24, rasterized by the RIP processor, and then transferred to the print engine 15. FIG. 10B is a data flow by the parallel printing process shown in FIG. 9. In many cases, speed of reading by the file read-out processor is higher than speed of download by the download processor. Thus, as described above, printing of a first page is likely to be started earlier according to the parallel mode, and speed of printing after start of the printing is likely to be higher according to the separate mode.

The external function process will be described again by referring back to FIG. 2. After execution of the read-out printing process in S116 or after execution of the parallel printing process in S119, the CPU 11 proceeds to S108 to determine whether the instruction data during execution contains further information about a next URL. If the received instruction data is determined to be operation instruction data and determined not to be instruction data for download printing (S110: NO), the CPU 11 performs a process based on this instruction data (S120). S120 is an example of particular image processing. After execution of S120, the CPU 11 proceeds to S108.

An external function executable by the printer 1 is not limited to the download printing function. If the printer 1 has a document scanning function in addition to the printing function, for example, a scanning and uploading function may be provided as an external function. In this case, instruction data for performing the scanning and uploading function is prepared in the server 3, and access information about the prepared instruction data is registered as a function URL by a designer of the print system 100, for example. Based on received instruction data, the printer 1 performs appropriate processing in S120 regarding an external function other than the download printing function.

If the received instruction data is determined to contain information about a next URL (S108: YES), the CPU 11 acquires next instruction from the server 3 based on the next URL information, as described above. If the received instruction data is determined not to contain information about a next URL (S108: NO), the CPU 11 finishes the external function process.

A trigger for causing the printer 1 of this embodiment to perform the download printing function is not limited to a user's instruction. The external function program 22 in the printer 1 may contain the function URL 222 including access information and an access condition, in addition to the function URL 221 including access information for accessing the server 3 in response to a user's instruction. More specifically, the function URL 222 includes access information indicating operation instruction data, and an access condition indicating fixed time such as once a day or once a week or after passage of a particular period of time from a power-on time, for example, which are registered as a set. The fixed time is an example of timing information, and a condition for arrival of the fixed time is an example of a first access condition.

In response to determining that the access condition included in the function URL 222 is satisfied in a state where the function URL 222 is registered, the printer 1 receives instruction data from the server 3 by using the access information. If the received instruction data is operation instruction data instructing execution of download printing, in response to starting execution of the external function program 22 based on the function URL 222, the printer 1 performs the download printing by the separate mode or the parallel mode based on the mode information as described above.

As the printer 1 accepts and registers timing of accessing the server 3, namely, timing of receiving instruction data and starting download printing, the printer 1 automatically starts the download printing. On the other hand, in a case where the printer 1 accesses the server 3 based on a user's instruction given via the user interface 13, download printing is performed according to timing which is desired by the user of the printer 1.

Figure 11:
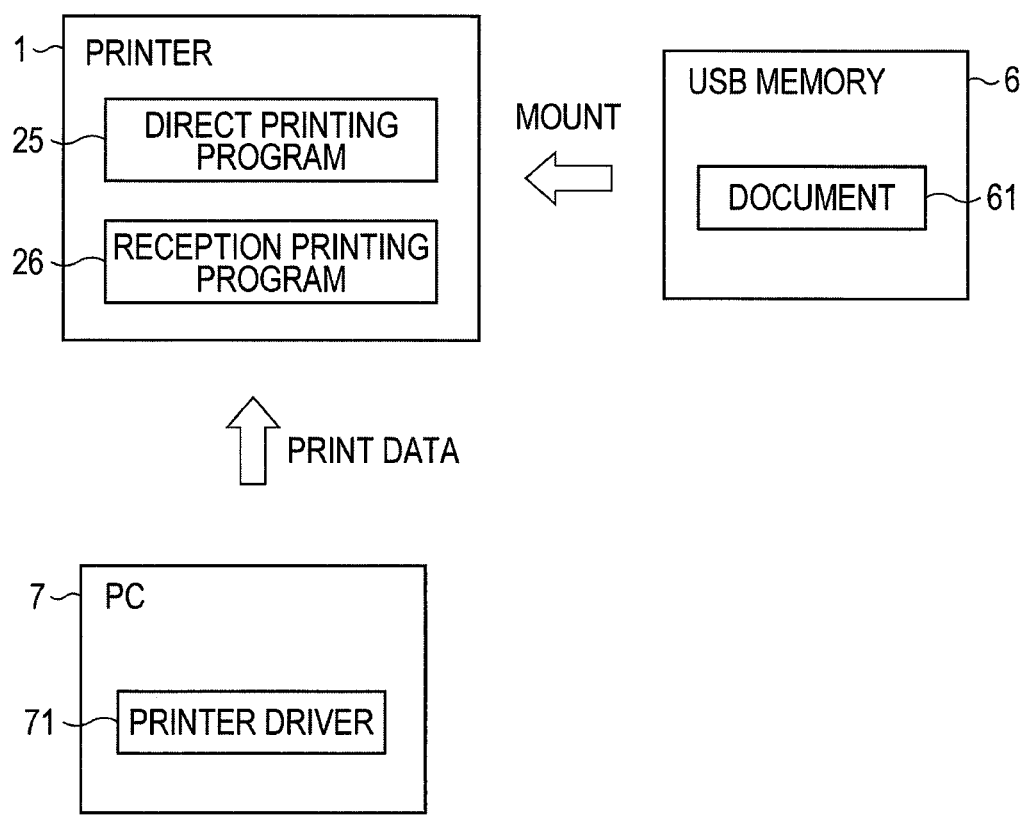
FIG. 11 is an explanatory diagram showing functions other than the download printing by a printer.

The printer 1 of this embodiment may be configured to perform a function by a program prepared in advance, in addition to a function performed by the external function program 22. As shown in FIG. 11, for example, if the printer 1 includes a direct printing program 25 and a reception printing program 26, the printer 1 is configured to perform a direct printing function and a reception printing function.

The direct printing function is a function of reading a document from an external storage connected to the printer 1 and printing the read document. If a USB memory 6 is mounted on the printer 1, for example, the printer 1 accepts an instruction to print a document 61 stored in the USB memory 6. The USB memory 6 is an example of a memory connected to the printer 1. If the USB memory 6 is mounted on the printer 1 and the printer 1 accepts an instruction to perform the direct printing, like in the separate mode described above, the printer 1 first acquires the entire document 61 from the USB memory 6 and stores the acquired document 61 once into a temporary file. Then, the printer 1 reads out the data from the temporary file and writes the read data into the RIP buffer 24, thereby performing the printing. As the reception of the document 61 is substantially completed, the direct printing is performed by the separate mode in this example.

The reception printing function is a function of receiving print data via the communication interface 14 from an external device such as a personal computer (hereinafter referred to as "PC") 7, and performing printing based on the received print data. The PC 7 includes a printer driver 71 compatible with the printer 1, and generates print data by using the printer driver 71 and transmits the generated print data to the printer 1 based on a user's instruction, for example. The PC 7 is an example of an information processing apparatus. If the printer 1 accepts an instruction to receive the print data from the PC 7, for example, the printer 1 receives the print data from the PC 7 and at the same time, writes the received data into the RIP buffer 24. In this way, the printer 1 performs reception of the print data and rasterizing or printing in parallel, like in the parallel mode described above. Since in some cases it is not known when reception of a document will be completed in the reception printing, the parallel mode is employed to receive the document and perform printing in parallel in this example.

As described in detail above, the printer 1 of this embodiment is configured to execute download printing of downloading a document and performs printing based on the downloaded document, based on the instruction data received from the server 3. The printer 1 supports at least two print modes of download printing, which are the separate mode and the parallel mode. The instruction data stored in the server 3 may include mode information indicating the print mode of download printing. The printer 1 performs download printing according to the print mode indicated in the mode information included in the instruction data. Thus, it is expected that download printing is performed by the print mode that suits the user's purpose and preference.

Further, in this embodiment, since the instruction data may include information for specifying the separate mode or the parallel mode, the designer of the print system 100 and so on may select in advance a print mode suitable for the data of the print target.

While the disclosure has been described in detail with reference to the above aspects thereof, it would be apparent to those skilled in the art that various changes and modifications may be made therein without departing from the scope of the claims.

For example, the printer is not limited to a single-function printer, but may be applied to any apparatus having a printing function and a communication function via a network, such as a multifunction peripheral, a copier, and a fax machine.

In this embodiment, as the operation instruction data, an example is shown in which one document is specified as the print target of download printing. However, one operation instruction data may specify a plurality of documents. For example, the server 3 may be provided with operation instruction data including a plurality of <Path> tags. In that case, if the parallel mode is specified, the printer 1 may perform download printing of one document by the parallel mode, and then perform download printing of the next document by the parallel mode. If the separate mode is specified or the print mode is not specified, the printer 1 may start printing after downloading all the specified documents, or, upon completion of download of at least one of the specified documents, may start printing from the downloaded document.

The modes of the display screen illustrated in this specification are examples, and the arrangement of each button, the wording included, and so on are not limited to the modes shown in these figures. For example, there may be display instruction data that displays a selection screen that allows the user to select a plurality of documents. When a plurality of documents are specified on the selection screen, the printer 1 may transmit a transmission instruction including a plurality of parameters to the server 3, or may transmit a transmission instruction for each document to the server 3 sequentially.

The printer 1 of this embodiment accepts an execution instruction of download printing as the execution instruction of the external function program 22, and then accepts the selection of the document to be downloaded by the use's input, but the present disclosure is not limited to this. For example, the designer and so on of the print system 100 may preliminarily store, in the memory 12, a function URL indicating the operation instruction data for download printing of a particular document. In that case, the printer 1 receives a download printing instruction preliminarily including the designation of the document as an execution instruction of the external function program 22, and thus performs download printing without displaying the selection screen as shown in FIG. 3B and so on.

In this embodiment, the size of the DL buffer 23 and the RIP buffer 24 is fixed, but the size of each buffer may be variable. Further, the printer 1 of this embodiment is configured to return the parameter to the server 3, but the printer may not be configured to return the parameter. Further, the printer 1 of this embodiment starts the read-out printing process when the free space of the memory 12 becomes low during the download process of the separate mode, but the process may be interrupted as an error. Further, in this embodiment, in direct printing and reception printing, the print mode is preliminarily determined, but it may be selectable. Further, in this embodiment, it is possible to register the function URL 222 in which access conditions are preliminarily specified, but it is not necessary. That is, an execution instruction of the download printing may be accepted only by the user's operation.

In any of the flowcharts disclosed in the embodiments, the plurality of processes in any of the plurality of steps may be arbitrarily changed in the execution order or executed in parallel as long as the process contents do not conflict with each other.

The processes disclosed in the embodiment may be executed by a single CPU, a plurality of CPUs, hardware such as an ASIC, or a combination thereof. Further, the processes disclosed in the embodiment may be realized in various modes such as a storage medium storing a program for executing the processes, a method, and so on.

What is claimed is:

1. A printer comprising:
a communication interface;
a print engine; and
a controller configured to:
acquire access information indicating a transmission source of instruction data, the instruction data instructing a process to be executed by the printer, the process to be executed by the printer including download printing of downloading a document from a storage on a network and printing the document, the instruction data being configured to include mode information indicating a print mode in the download printing, the print mode including a first mode and a second mode different from the first mode;
based on the access information, access, via the communication interface, a server that is the transmission source of the instruction data, and receive the instruction data transmitted from the server; and
in response to determining that the instruction data instructs execution of the download printing,
extract the mode information from the instruction data;
based on the mode information, download, via the communication interface, the document specified by an execution instruction of the download printing, from the storage, thereby receiving the document; and
control the print engine to perform printing based on the received document, thereby performing the download printing,
the download printing including:
in response to extracting the mode information indicating the first mode, performing the download printing by the first mode, the first mode being a mode of, after completing reception of an entirety of the document, starting printing based on the entirety of the document; and in response to extracting the mode information indicating the second mode, performing the download printing by the second mode, the second mode being a mode of, before completing reception of the entirety of the document, starting printing based on a received portion of the document, the second mode being a mode in which reception of the document and printing based on the document are performed in parallel.

2. The printer according to claim 1, wherein the execution instruction of the download printing specifies the document with a file name; and wherein the controller is configured to, in the download printing:

when performing the download printing with by first mode, after completing reception of the entirety of the document of the file name, start printing based on the received document; and when performing the download printing by the second mode, before completing reception of the entirety of the document of the file name, start printing based on the received portion of the document, thereby performing reception of the document and printing based on the document in parallel.

3. The printer according to claim 1, wherein the controller is configured to:

acquire an access condition that is a condition for accessing the server; and in response to determining that the access condition is satisfied, acquire the access information and receive the instruction data by using the access information.

4. The printer according to claim 3, wherein the controller is configured to:

acquire timing information indicating timing to access the server, the access condition including a first access condition indicating that the timing has come; and in response to determining that the timing has come in a state where the first access condition is acquired, acquire the access information and receive the instruction data by using the access information.

5. The printer according to claim 1, further comprising a user interface, wherein the controller is configured to:

accept, via the user interface, an input of an access operation of accessing the server; and in response to the input of the access operation, read the access information and receive the instruction data by using the access information.

6. The printer according to claim 1, further comprising a user interface, wherein the controller is configured to:

in response to determining that the download printing is not instructed in the instruction data and display of an input screen is instructed in the instruction data, the input screen being a screen for receiving an input via the user interface:

display the input screen on the user interface, the input screen being configured to accept an input of a reception operation, the reception operation being for instructing reception of next instruction data, the reception operation being associated with the access information indicating a transmission source of the next instruction data; and in response to the input of the reception operation, receive the instruction data by using the access information of the next instruction data;

in response to determining that the download printing is not instructed in the instruction data and display of the input screen is not instructed in the instruction data and execution of particular image processing is instructed in the instruction data, execute the particular image processing, the particular image processing being different from the download printing; and in response to determining that the download printing is instructed in the instruction data, extract the mode information and execute the download printing; and wherein the download printing includes:

in response to extracting the mode information indicating the first mode, performing the download printing by the first mode; and in response to extracting the mode information indicating the second mode, performing the download printing by the second mode.

7. The printer according to claim 6, wherein the controller is configured to:

in response to determining that the download printing is not instructed in the instruction data and display of the input screen is instructed in the instruction data and execution of a reply process is instructed in the instruction data, display the input screen on the user interface, the input screen being configured to accept an input of the parameter and an input of the reception operation, the reception operation being for instructing reception of the next instruction data, the reception operation being associated with the access information indicating the transmission source of the next instruction data; and in response to the input of the reception operation, receive the instruction data by using the access information of the next instruction data, return the parameter to the server when accessing the server, the parameter being a parameter inputted via the input screen, the parameter indicating at least a document to be printed or a print setting, and then receive the instruction data including the parameter from the server; and wherein the download printing includes:

receiving the document specified by the instruction data including the parameter indicating the document to be printed;

in a case where the parameter further indicates the print setting, controlling the print engine to perform printing based on the document with the print setting indicated by the parameter;

in response to extracting the mode information indicating the first mode, performing the download printing by the first mode; and in response to extracting the mode information indicating the second mode, performing the download printing by the second mode.

8. The printer according to claim 1, wherein the printer is configured to perform:

direct printing of reading a document data stored in an external memory connected to the printer, and printing a document indicated by the document data; and reception printing of receiving, via the communication interface, print data generated by a printer driver included in an information processing apparatus, the information processing apparatus being connected via the communication interface, and printing a document indicated by the print data; and wherein the controller is configured to:
perform the direct printing by the first mode; and
perform the reception printing by the second mode.

9. The printer according to claim 1, further comprising:
a first buffer configured to temporarily store a received document; and
a second buffer used for generating print data,
wherein the controller is configured to:
when a document is inputted to the second buffer, execute a raster process, the raster process being a process of rasterizing the document in the second buffer and generating the print data, the print engine being configured to perform printing based on the print data generated by the raster process;
in the first mode, input the received document to the first buffer, complete reception of an entirety of the document specified by the instruction data of the download printing, and then input the document in the first buffer to the second buffer, thereby starting the raster process; and
in the second mode, before completing reception of the entirety of the document, input the received document to the second buffer, thereby starting the raster process.

10. The printer according to claim 9, wherein the printer is configured to perform:
direct printing of reading a document data stored in an external memory connected to the printer, and printing a document indicated by the document data; and
reception printing of receiving, via the communication interface, print data generated by a printer driver included in an information processing apparatus, the information processing apparatus being connected via the communication interface, and printing a document indicated by the print data; and
wherein the controller is configured to:
in the direct printing, input the document read from the external memory to the second buffer, thereby starting the raster process; and
in the reception printing, before completing reception of the print data from the information processing apparatus, input the received print data to the second buffer, thereby starting the raster process, and inputting the received print data to the second buffer, the raster process, and printing based on the print data are performed in parallel.

11. The printer according to claim 1, wherein the download printing includes:
in response to extracting the mode information indicating the second mode and determining that the document is a particular format, the particular format being specified by the instruction data of the download printing, performing the download printing by the second mode, the particular format including a format of a document created by a printer driver of the printer; and
in response to extracting the mode information indicating the second mode and determining that the document is not the particular format, the particular format being specified by the instruction data of the download printing, not performing the download printing by the second mode.

12. The printer according to claim 1, wherein the download printing includes:

in response to determining that the download printing is started by the first mode and then a free space of a memory storing the received document becomes smaller than a threshold value, switching to the second mode and continuing the download printing.

13. The printer according to claim 1, wherein either one of the first mode and the second mode is set as a default print mode for the printer; and
wherein the download printing includes:
in response to determining that the mode information is not extracted, performing the download printing by the default print mode.

14. The printer according to claim 1, further comprising a memory storing the access information,
wherein the controller is configured to acquire the access information stored in the memory.

15. A print system comprising a printer and a server,
the printer configured to:
acquire access information indicating a transmission source of instruction data, the instruction data instructing a process to be executed by the printer, the process to be executed by the printer including download printing of downloading a document from a storage on a network and printing the document, the instruction data being configured to include mode information indicating a print mode in the download printing, the print mode including a first mode and a second mode different from the first mode; and
based on the access information, request the server to transmit the instruction data;
the server configured to:
in response to receiving a request for transmitting the instruction data, transmit the instruction data to the printer;
the printer configured to:
receive the instruction data transmitted from the server; and
in response to determining that the instruction data instructs execution of the download printing,
extract the mode information from the instruction data;
based on the mode information, download the document specified by an execution instruction of the download printing from the storage, thereby receiving the document; and
perform printing based on the received document, thereby performing the download printing,
the download printing including:
in response to extracting the mode information indicating the first mode, performing the download printing by the first mode, the first mode being a mode of, after completing reception of an entirety of the document, starting printing based on the entirety of the document; and
in response to extracting the mode information indicating the second mode, performing the download printing by the second mode, the second mode being a mode of, before completing reception of the entirety of the document, starting printing based on a received portion of the document, the second mode being a mode in which reception of the document and printing based on the document are performed in parallel.

16. A non-transitory computer-readable storage medium storing a set of program instructions for a printer, the set of program instructions, when executed by a controller of the printer, causing the printer to:
- acquire access information indicating a transmission source of instruction data, the instruction data instructing a process to be executed by the printer, the process to be executed by the printer including download printing of downloading a document from a storage on a network and printing the document, the instruction data being configured to include mode information indicating a print mode in the download printing, the print mode including a first mode and a second mode different from the first mode;
- based on the access information, access, via a communication interface of the printer, a server that is the transmission source of the instruction data, and receive the instruction data transmitted from the server; and
- in response to determining that the instruction data instructs execution of the download printing,
    - extract the mode information from the instruction data;
    - based on the mode information, download, via the communication interface, the document specified by an execution instruction of the download printing from the storage, thereby receiving the document; and
    - control a print engine of the printer to perform printing based on the received document, thereby performing the download printing, the download printing including:
- in response to extracting the mode information indicating the first mode, performing the download printing by the first mode, the first mode being a mode of, after completing reception of an entirety of the document, starting printing based on the entirety of the document; and
- in response to extracting the mode information indicating the second mode, performing the download printing by the second mode, the second mode being a mode of, before completing reception of the entirety of the document, starting printing based on a received portion of the document, the second mode being a mode in which reception of the document and printing based on the document are performed in parallel.

* * * * *

UNITED STATES PATENT AND TRADEMARK OFFICE
CERTIFICATE OF CORRECTION

PATENT NO. : 11,630,977 B2
APPLICATION NO. : 17/712330
DATED : April 18, 2023
INVENTOR(S) : Katsunori Enomoto It is certified that error appears in the above-identified patent and that said Letters Patent is hereby corrected as shown below:

In the Claims

Column 17, Claim 2, Line 18 should read:
when performing the download printing by first Signed and Sealed this
Twenty-first Day of November, 2023

Katherine Kelly Vidal
*Director of the United States Patent and Trademark Office*